(12) United States Patent
Calhoun

(10) Patent No.: US 6,181,409 B1
(45) Date of Patent: *Jan. 30, 2001

(54) SYSTEM FOR BACKPRINTING PHOTOGRAPHIC MEDIA

(75) Inventor: Lee M. Calhoun, Bergen, NY (US)

(73) Assignee: Eastman Kodak Company, Rochester, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/023,927

(22) Filed: Feb. 13, 1998

(51) Int. Cl.[7] ............................. G03B 27/32; G03B 27/52; G03B 27/44
(52) U.S. Cl. ................................. 355/39; 355/40; 355/46
(58) Field of Search .................. 355/39, 40, 41, 355/42, 43, 35, 16, 68, 69, 71; 358/487, 474, 506; 396/310; 360/3

(56) References Cited

U.S. PATENT DOCUMENTS

| | | |
|---|---|---|
| 4,239,376 | 12/1980 | Wyller . |
| 4,239,377 | 12/1980 | Rasmussen, Jr. . |
| 4,506,824 | 3/1985 | Bartz . |
| 4,534,250 | 8/1985 | Garrocho . |
| 4,629,312 | 12/1986 | Pearce et al. . |
| 4,637,712 | 1/1987 | Arnold et al. . |
| 4,659,213 | 4/1987 | Matsumoto . |
| 4,823,163 | 4/1989 | Rollet et al. . |
| 5,294,950 | 3/1994 | DuVall et al. . |
| 5,369,467 | 11/1994 | Monroe . |
| 5,452,055 | 9/1995 | Smart . |
| 5,471,265 | 11/1995 | Shibata et al. . |
| 5,530,517 | 6/1996 | Patton et al. . |
| 5,546,196 | 8/1996 | Huot et al. . |
| 5,552,855 | 9/1996 | Smart . |
| 5,585,879 | 12/1996 | Tahara et al. . |
| 5,600,498 | 2/1997 | Motooka et al. . |
| 5,629,753 | 5/1997 | Akira . |
| 5,703,701 | * 12/1997 | Yamamoto et al. ............. 358/487 |
| 5,767,945 | * 6/1998 | Fields et al. .................... 355/39 |
| 5,767,946 | * 6/1998 | Nakamura et al. .............. 355/39 |
| 5,841,885 | * 11/1998 | Neff et al. ....................... 355/40 |

OTHER PUBLICATIONS

Lucht Engineering, Inc., "Lucht Model PM8 Package Punch Marker", undated.

* cited by examiner

*Primary Examiner*—David M. Gray
*Assistant Examiner*—Peter B. Kim
(74) *Attorney, Agent, or Firm*—Gordon M. Stewart; David A. Novais

(57) ABSTRACT

A method of providing information on the back side of a developed photographic medium having an image carrying layer on the front side. The method comprises machine reading code on the developed imaging carrying layer on the front side of the photographic medium. In the method, information is printed on the back side of the developed photographic medium with a printer, based on the machine read code. An apparatus, which can execute a method of the invention, for providing information on a back side of a developed photographic medium having an image carrying layer on the front side, has a reader to read machine readable code in the developed imaging carrying layer on the front side of the photographic medium. The apparatus further has a printer communicating with the reader so as to print information on the back side of the developed photographic medium based on the machine read code. The method may include printing and developing the photographic medium.

23 Claims, 5 Drawing Sheets

SYSTEM FOR BACKPRINTING PHOTOGRAPHIC MEDIA

FIELD OF THE INVENTION

The present invention relates to photofinishing, and in particular to a system method for backprinting information on a photographic media.

BACKGROUND OF THE INVENTION

In photofinishing, a customer typically delivers one or more rolls of exposed photographic film to a photofinisher, and requests prints (which may be made on a transparent media but are usually on a reflective media such as paper). The film is first developed, if not already developed, and prints are formed by either optically (e.g. with an optical enlarger) or digitally printing at a printing gate of a printer onto a photosensitive medium in the form of a sheet or continuous web. In digital printing, the images from the developed film are first scanned to obtain corresponding digital image signals, which following any desired digital image processing, may be printed onto the photosensitive medium using a suitable digital image printer, such as a laser printer, LED printer, or a CRT printer. The photosensitive medium is then developed (that is, chemically processed to yield a fixed image). Each customer order will typically include many prints. In the case where a photosensitive web is used for printing, multiple orders will have to be separated and typically multiple prints within each order will also have to be separated. Even when the printer uses individual sheets of photosensitive media for each order, at least some (and often, all) of the prints within an order will typically have to be separated from one another.

Prints are separated from one another by a cutter. The cutter has conventionally received its instructions from a code punched through the photosensitive media at or near the printing gate. After the photosensitive media carrying the printed images has been developed, this punch code is read and instructions provided to the cutter. The punched code is typically obliterated or cut off during the cutting step if the photofinisher cuts the prints, or cut off by the customer at a later time since, in either event a customer often only wishes to see images without borders. Such a system is described in U.S. Pat. No. 4,506,824, this system allowing cutting of prints on lines both across and along the direction of the web. Thus, many different sized prints can be accommodated across the width of the photosensitive web.

In the photofinishing operation, the final prints of an order must be kept together and matched with the corresponding customer film. One way of doing this is to print a code or human readable characters (such as alphanumeric characters) on the back side of each print or at least one of the prints in the customer order. Such back side printing can be done after the prints have been developed. This method would require some means of tracking the location of which prints belong with a particular customer film, so that any information unique to particular prints can be printed on the back side of the correct prints. However, customer films are usually batched on a single reel, and the reel is often moved between independent components (e.g. film developer and printer) in the photofinishing process. Further, the resulting prints are often in a batch (such as on a reel) which must also be moved between an independent printer, developer and cutter. Thus, keeping track of which prints belong to a given customer order or which film they are associated with, becomes a daunting task. The task of such tracking can be substantially reduced if the customer identification is printed on the back side of the print media (that is, the side opposite the photosensitive side). One way of accomplishing such back side printing is described in U.S. Pat. No. 4,629,312.

In addition to printing information on the back side of the photosensitive medium which identifies the prints for later association with a corresponding customer film, it may also be desirable to print other information on the back side. Such information may include picture taking conditions (e.g. date, lighting used, and the like), as well as advertising for the photofinishing outlet or others. However, printing any information on the back side of an undeveloped photosensitive media can create problems. In particular, the ink used often does not completely withstand the chemical development steps. This not only leads to loss of resolution of the printed matter, but can lead to contamination of the photoprocessing chemicals by ink or its reaction products which are leached from the photosensitive media during chemical developing. Furthermore, as developed web is rolled back onto a reel, or in the case of individual photosensitive sheets, as the developed sheets are stacked one on top of the other, the back side of one print is pressed against the emulsion carrying side (which now carries the developed image) on the front side. This can result in transfer of ink from the back side to the front side, particularly since the emulsion may still have a high water content at this point.

It would be desirable then, to provide some way of enabling printing on the back side of a photographic print, which does not result in the possibility of introducing printing inks into the chemical developing process, which reduces the possibility of ink transfer from the back side onto an incompletely dry image carrying emulsion, and which does not require complex means of tracking particular prints or customer orders between the image printing station, the developer, and the cutter.

SUMMARY OF THE INVENTION

The present invention then provides, in one aspect, a method of providing information on the back side of a developed photographic medium having an image carrying layer on the front side. The method comprises machine reading code on the developed imaging carrying layer on the front side of the photographic medium. In the method, information is printed on the back side of the developed photographic medium with a printer, based on the machine readable code.

In another aspect of the present invention, a method of providing information on a back side of a photographic medium having a photosensitive layer on a front side, comprises the following steps. A modulated light source writes a photographic image on the photosensitive layer. A modulated light source (which may be the same or different from the image writing modulated light source) writes machine readable code on the photosensitive layer. The photographic medium is then developed (that is, chemically processed to yield a fixed image). The code on the front side of the developed photographic medium is machine read. Information is printed on the back side of the developed photographic medium with a printer, based on the machine read code. This includes the printed information being, or being derived using, part or all of the machine read code from the front side of the developed photographic medium.

The photographic medium may be one or more independent photographic sheets, or a continuous web of photographic material. One or more images may be written on the photographic medium as a customer order. These images may be the same or different and may be arranged in any configuration, including multiple images transversely across the sheet between two opposite side edges. The information printed on the back side may be printed in one location for a given customer order of one or more images, or may be printed opposite each of the developed photographic images (that is, so the back side of one or more of the developed images carries printed information). Such information may be based at least in part on a single machine readable code segment. Alternatively, multiple separate code segments may be written on the photosensitive layer as separate code segments which are positioned adjacent respective photographic images. With multiple code segments, the information written on the back side of each developed image may be based on an information segment adjacent each image.

The present invention also provides an apparatus which, in one or more aspects, can execute one or more methods of the present invention. In one aspect, the apparatus is for providing information on a back side of a developed photographic medium having an image carrying layer on the front side. Such an apparatus comprises a reader to read machine readable code in the developed imaging carrying layer on the front side of the photographic medium. The apparatus further comprises a printer communicating with the reader so as to print information on the back side of the developed photographic medium based on the machine read code.

In another aspect of the present invention, there is provided an apparatus for providing information on a back side of a photographic medium having a photosensitive layer on a front side. This apparatus includes a modulated light source to write a photographic image on the photosensitive layer. A modulated light source (which may be the same or different from the image writing light source) is provided to write machine readable code on the photosensitive layer. A developer chemically develops the photographic medium. Additionally, a reader is provided to read the machine readable code on the front side of the developed photographic medium. A printer communicates with the reader so as to print information on the back side of the developed photographic medium based on the machine read code.

The method and apparatus of the present invention, provides a way by which printing on the back side of a photographic print can readily be accomplished. This printing does not result in introducing printing inks into the chemical developing process since no printing ink is applied until after the photographic medium is developed. Further, when the back side printing is applied (near the cutter position), the developed medium will be drier than when the photographic medium has just passed through the developer. This maintains low possibility of ink transfer from the back side onto the image carried by the photographic emulsion. Furthermore, since the code carrying the necessary information can be printed near the prints of a given customer order, it is still associated with those prints immediately before cutting. This means that the information which might be desired to be printed on the back side of images, such as information which may be unique to a particular customer order or particular prints (for example, customer identification, picture taking conditions, and the like), is still associated with those prints immediately before the backprinting. Therefore, complex means of tracking the location of particular prints which might be associated with disembodied unique information, is not required.

BRIEF DESCRIPTION OF THE DRAWINGS

Embodiments of the invention will now be described with reference to the drawings, in which.

Where possible, the same reference numerals have been used to indicate like parts.

DETAILED DESCRIPTION OF THE INVENTION

Figure 1:
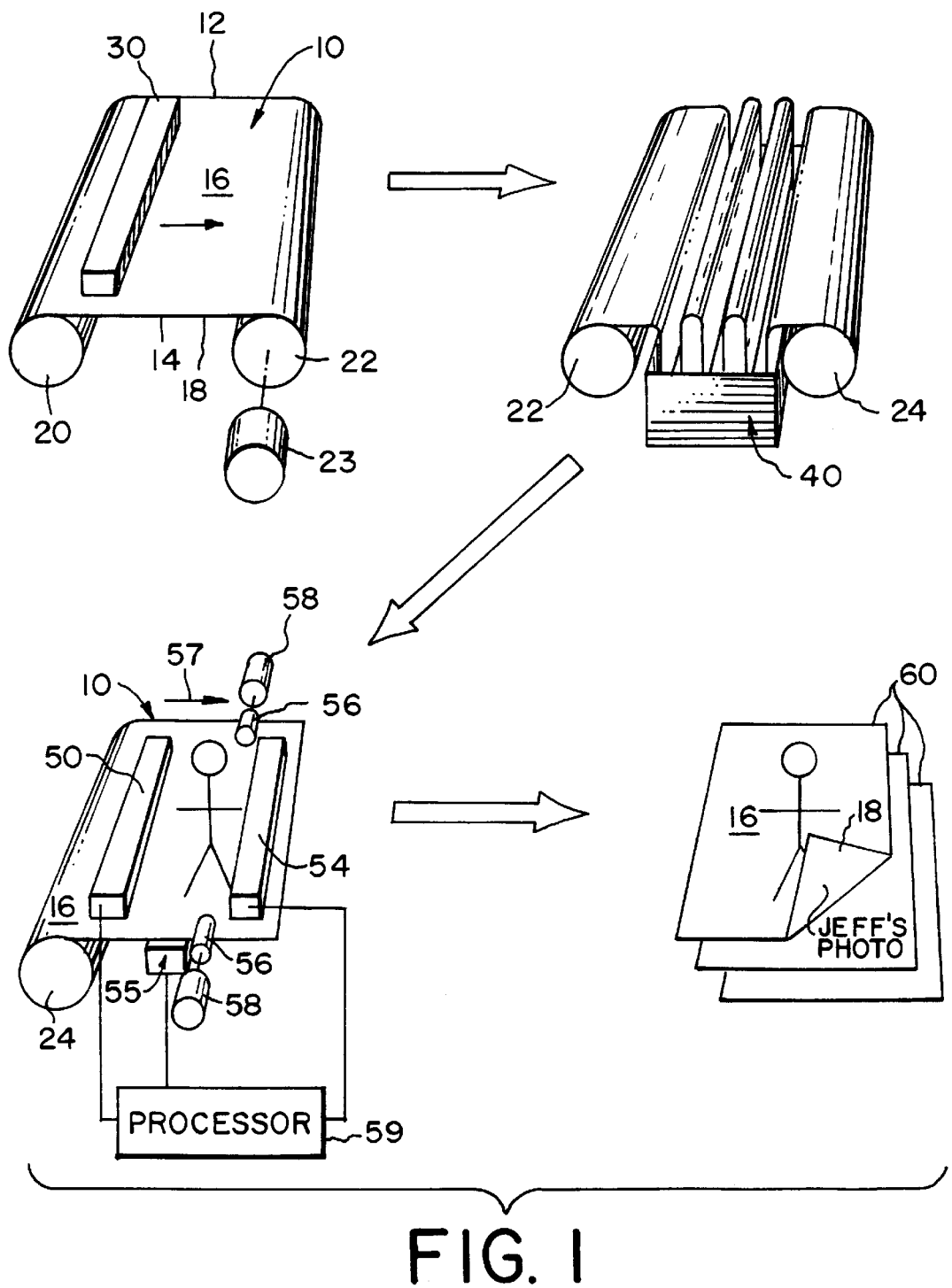
FIG. 1 illustrates a method and an apparatus of the present invention.

Referring to FIG. 1, the particular apparatus of the present invention shown is intended to be used with a continuous web 10 of a photographic medium. Web 10 has a front side carrying a photosensitive layer, and an opposite back side 18, as well as two parallel straight line edges 12, 14. The web also has a base, one side of the base defining the back side 18 of web 10. The base may be either transparent (when transparent prints are desired) or reflective (for example, paper). The photosensitive layer be any suitable layer and include one or more sub-layers. For example, the layer may be one or more sub-layers of a light sensitive silver halide in gelatin emulsion. When web 10 is a full color photographic paper or film, the photosensitive layer will typically include three layers each carrying silver halide emulsions sensitized to respective red, green and blue spectral regions, as well as respective color couplers which produce respective image dyes (such as cyan, magenta, and yellow) upon development to yield a fixed image.

The apparatus includes a modulated light source in the form of an image and code writer 30. Image and code writer 30 may be any suitable modulated light source such as one or more lasers, a Cathode Ray Tube ("CRT") printer, a Light Emitting Diode ("LED") printer, under the control of a suitable processor which has access to a memory device holding multiple digital image signals corresponding to images to be written onto photographic web 10. A driver, such as a drive motor 23 is provided to move web 10 from a dispensing reel 20 to a take up reel 22 as the images are exposed on the front side 16 of web 10. The apparatus also includes at the same location (that is, generally within the same building or room), a developer 40. Developer 40 includes all the necessary components and chemistry as required to chemically develop latent images on exposed web 10. A suitable driver (not shown), which includes one or more motors and or rollers, is also present to move the web from reel 22 to another reel 24.

A portion of the apparatus shown in the lower left hand corner of FIG. 1 can be considered an apparatus of the present invention by itself, or as part of an apparatus of the present invention which includes the remainder of the components of FIG. 1. This portion includes a reader 50, such as a bar code reader, to read machine readable codes which might occur at most positions across (that is, in a direction between edges 12, 14) web 10 in the developed photosensitive layer (now an image carrying layer). That is, reader 50 will detect codes anywhere across most of the width of web 10. The codes may, for example, be any form of suitable machine readable code, such as a bar code, a series of dots and/or dashes, or human readable characters which can be recognized using optical character recognition, or any combination of the foregoing. A printer 55, such as a thermal, inkjet or impact printer, is positioned to print information on the back side 18 of the developed photographic web 10. An image cutter 54, has one or more blades and can cut web 10 along one or more lines parallel with edges 12, 14 or transverse to edges 12, 14, in a known manner. A driver in the form of a plurality of rollers 56 and connected drive motors 58 moves the web in a first direction (the direction of arrow 57) from reel 24. A processor 59 communicates with the reader 50, printer 55 and cutter 54.

Processor 59 may be any multipurpose processor suitably programmed to carry out all functions required of it, or may be an equivalent hardware or hardware and software combination. Processor 59 may include any suitable memory device for storing programs and/or required data. Processor 59 can instruct the printer 55 on the location on the back side 18 at which printer 55 is to print, by controlling the location of a print head in printer 55. These instructions can be received from the machine readable code read by reader 50. Furthermore, processor 59 can control cutter 54 to separate developed images at locations which are based on cutting instructions contained within the code read by reader 50. Alternatively, the positions at which printer 55 prints, and cutter 54 cuts, can be predetermined based simply on the location of a code read by reader 50. This latter arrangement can be used when it is known that each customer order will consist of the same number and relative locations of prints.

In operation, web 10 is driven from reel 20 to reel 22 by driver 23. At appropriate positions, image and code writer 30 will write both images from multiple customer orders using corresponding retrieved digital image signals, as well as machine readable codes as determined under the control of a suitably programmed processor (not shown) or equivalent hardware and/or software. The images and codes will be written as latent images. It should be noted that writer 30 can also write human readable characters (such as alphanumeric characters) as determined by the processor. When reel 22 is full, it is transferred to the developer. Here reel 22 will act as the supply reel while another reel 24 acts as the take up reel. The photographic web 10 is then driven through developer 40 to chemically develop all latent images and yield the written images and codes as viewable images or code images, respectively, within the now developed photosensitive layer (which is no longer photosensitive but is an image dye carrying gelatin layer referenced as an image carrying layer). When all of web 10 has been developed, it is transferred on reel 24 for reading, back printing and cutting. Web 10 is driven by the driver from reel 24, past code reader 50, back printer 55 and through cutter 54. Code reader 50 reads machine readable bar codes on the front side of web 10 as web 10 passes by. These codes are communicated to processor 59 which causes printer 55 to print on the back side 18 of web 10.

Printer 55 prints information at locations and/or of a content which is at least in part determined by the codes read by reader 50. The printed information will typically include human and/or machine readable information such as a unique identification of the prints or order, or picture taking conditions, and the like. As previously mentioned, cutter 54 cuts web 10 under control of processor 59 which control may be based in whole or in part upon instructions obtained from read codes. The resulting cut prints 60 can be packaged and delivered to the customer (usually along with the corresponding film from which the images were previously scanned).

Figure 2:
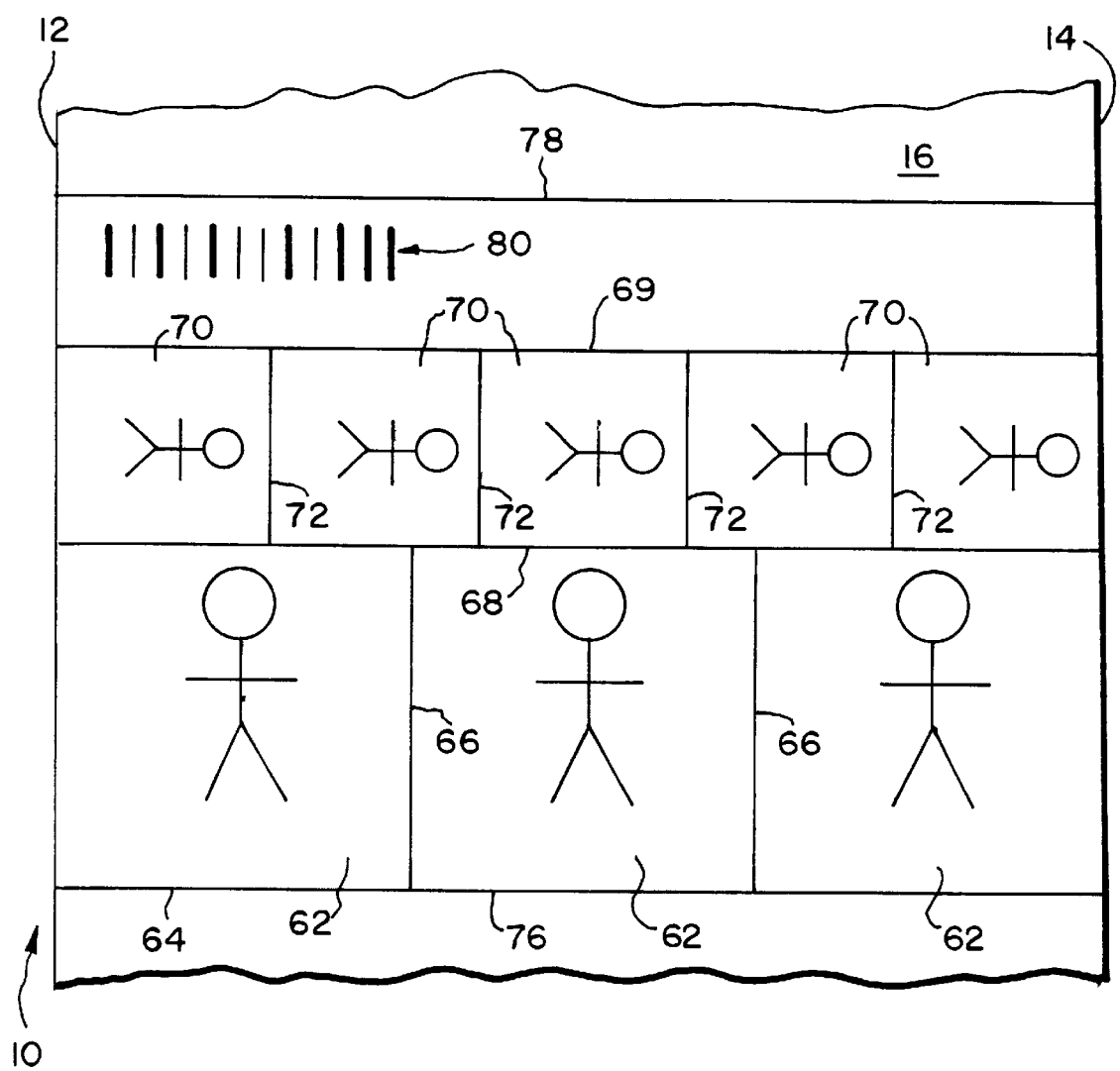
FIG. 2 is a view from a front side of a developed photographic medium produced by the method and apparatus of FIG. 1, bearing a single customer order, showing both the images and machine readable code.

FIG. 2 illustrates a portion of the front side of web 10 as it might typically appear as it leaves reel 24 to pass by reader 50. For example, the single customer order shown might include a first set of images 62 and a second set of images 70 each extending in a direction transversely between edges 12, 14. Any of images 62 and 70 may be the same or different, and the single same figure appearing in each is for illustrative purposes only. A line 64 and a line 78 define this order between them. Lines 66 separate images 62 while lines 72 separate images 68. A machine readable bar code 80 has been printed in a space between lines 69 and 78. All of the foregoing lines may be visible, for example, they may be lines on which nothing has been printed, or edges between printed and non-printed regions, or they may be simply the locations at which one image ends and another begins. The single bar code 80 in this case may contain printer instructions on what information is to be printed on the back side 18 (for example, human and/or machine readable information), as well as the location on the back side for such printing (for example, print behind each image 62, 70). Bar code 80 may also contain instructions for cutter 54 (e.g. cut along the locations defined by each of lines 76, 66, 68, 72, 69, 70). This not only separates the images 62, 78 from one another, but also separates a strip of the web 10 (defined by edges 12, 14 and lines 69, 78) carrying the bar code 80 (which is then typically discarded) from the remainder of the web 10. Alternatively, bar code 80 may only instruct cutter 54 to cut only along lines 64, 78 to provide the resulting cut sheet to the customer without further cutting. This is sometimes done in the case of professional prints where a single sheet carrying multiple copies of one or more images (such as wallet sized images) are provided to the customer along with a number of larger, individually cut images.

It will be appreciated though that in FIG. 2 (or in FIG. 3 discussed below), that the customer order carrying the images 62, 70 and bar code 80, could have been printed by printer 30 in an arrangement rotated ninety degrees about its center relative to the position shown in the drawings. That is, the sets of images 62 and 70 would extend in a direction along web 10 (rather than across web 10, as shown in FIGS. 2 and 3), and lines 76, 80 would in fact be edges 12, 14, respectively, or edges 14, 12 respectively.

Figure 3:
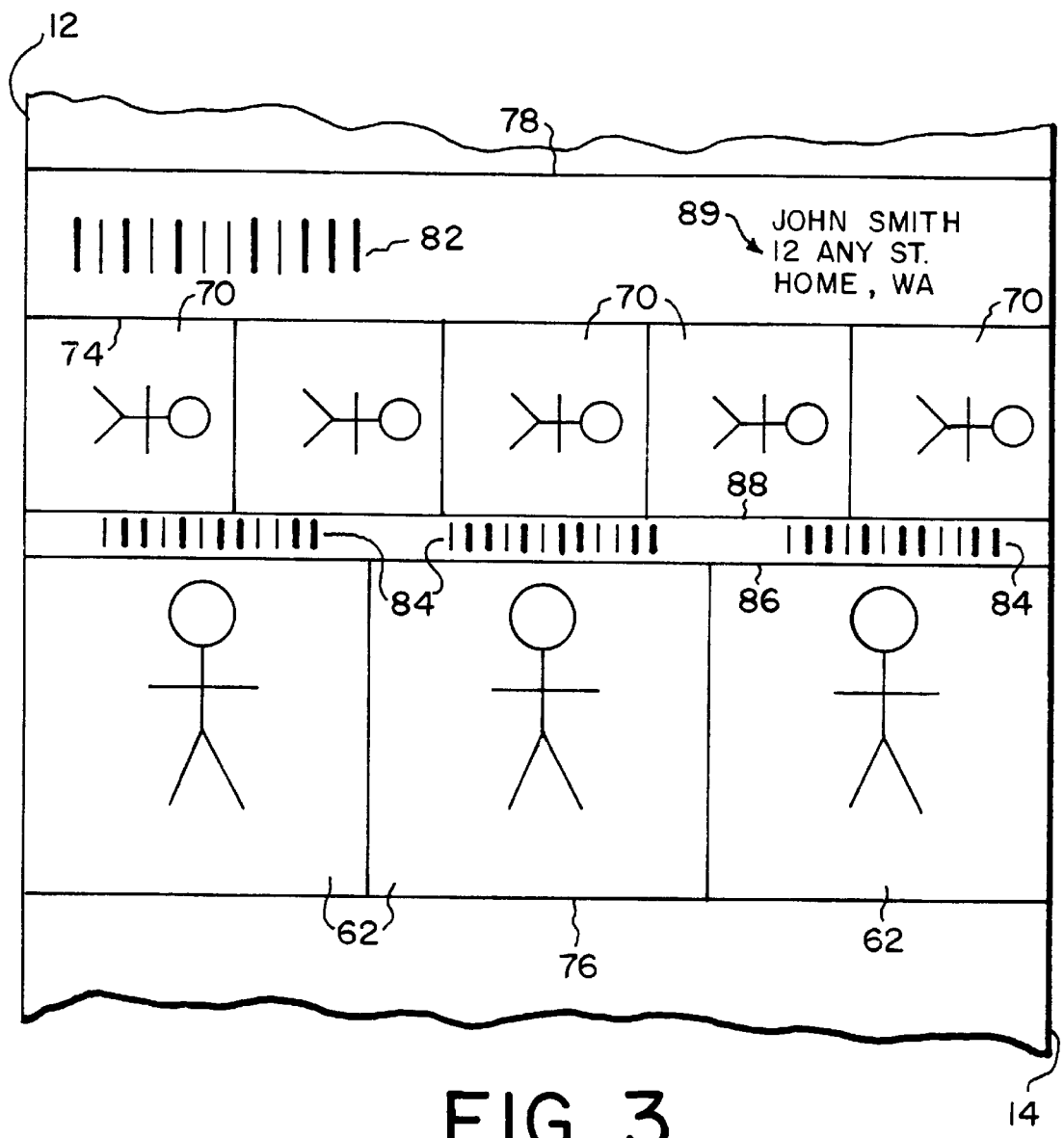
FIG. 3 is a view similar to FIG. 2 but in which the machine readable code is written as code segments and in which human readable characters have also been written.

Referring to FIG. 3, is similar to FIG. 3 but illustrates a different bar code arrangement. In FIG. 3, the machine readable code has been printed by writer 30 as separate (that is, spaced apart) code segments 82, 84. Code segment 82 may contain similar instructions as code 80, or only cutting instructions (including instructions to additionally cut along lines 86, 88) as well as information which is to be printed on the back side 18 opposite only images 70 or information which is to be printed opposite images 62 and 70. Code segment 82 may further instruct processor 59 to confirm that code segments 84 are also read. Each code segment 84 may further contain information specific for the each image 62 which is adjacent to it, which information is to be printed on the back side 18 at positions opposite respective images 62. For example, such image specific information may include picture taking conditions for each image when images 62 are different images.

In the configuration shown in FIG. 3, writer 30 has also written human readable alphanumeric characters 89 on web 10, in the form of a unique customer identification. Such a unique identification on the front side of web 10 facilitates ready human identification of a particular customer order while viewing the images 62, 70 (for example, for quality) without having to turn over web 10 and view printed information on the back side 18. This can be particularly helpful where the cutter 54 is instructed to cut only along lines 76, 78 and the resulting assemblage delivered to the customer, as described above. Note that the machine readable code segment 82 and human readable characters 89 are spaced apart along a line orthogonal (at ninety degrees to) the edges 12, 14. Also the plurality of code segments 84 also spaced apart from one another along a line orthogonal to side edges 12, 14 (although they could be spaced apart along a line parallel with edges 12, 14 where the customer order is printed in a position rotated ninety degrees from that shown in FIG. 3, as discussed above). These arrangements facilitate separating the web 10 segment carrying the code segment 82 and human readable characters 89 (defined between lines 74, 78), and separating the web segment carrying the code segments 84 (defined between lines 86, 88), from the remainder of the web 10 during cutting since only two cuts are required to separate each such web segment.

Figure 4:
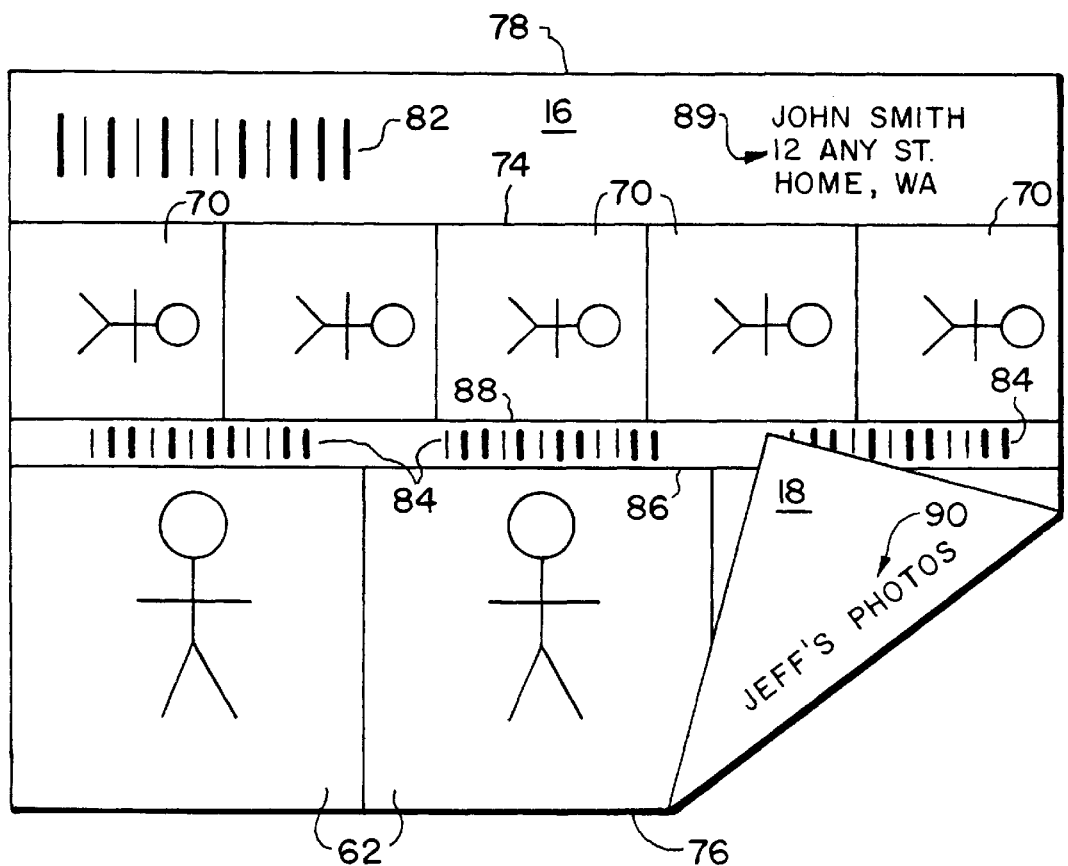
FIG. 4 illustrates part of the back side of the medium of FIG. 3.
Figure 5:
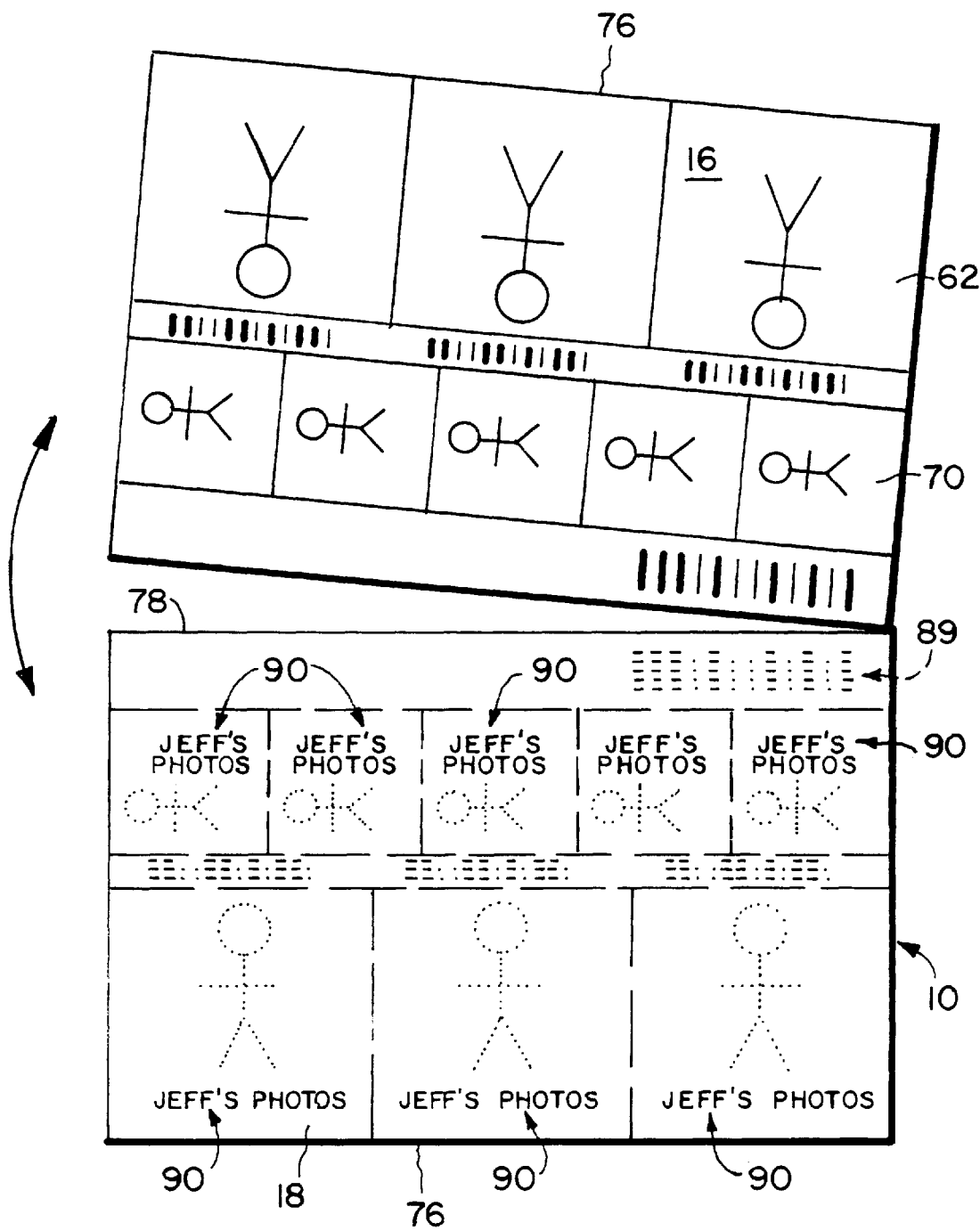
FIG. 5 is a complete back side view of the medium of FIG. 3.

FIG. 4 illustrates an assemblage from FIG. 3 wherein cutter 54 has been instructed to cut only along lines 76, 78. The human readable information 90 in the form of alphanumeric characters (although characters of other languages can, of course, be used), is printed on the back side 18 of web 10, opposite each of images based on instructions provided by one or more of code segments 82, 84. However, the information printed on the back side may alternatively be, or additionally include, machine readable code which may not be human readable. The particular printed information shown may be the same advertisement on back side 18 opposite each image 62, 70 but other information (such as discussed above) which may or may not be unique to each image and/or a customer may be printed instead, or in addition to, such same information. FIG. 5 more clearly illustrates the arrangement of information 90 on back side 18 of developed and cut web 10, the cut web portion shown being flipped over as shown in FIG. 5 to view back side 18.

The invention has been described in detail with particular reference to certain preferred embodiments thereof, but it will be understood that variations and modifications can be effected within the spirit and scope of the invention.

PARTS LIST

| | |
|---|---|
| 10 | Web |
| 12, 14 | Edges |
| 16 | Front side |
| 18 | Back side |
| 20 | Reel |
| 22 | Reel |
| 23 | Drive motor |
| 24 | Reel |
| 30 | Code writer |
| 40 | Developer |
| 50 | Reader |
| 54 | Image cutter |
| 55 | Painter |
| 56 | Rollers |
| 57 | Arrows |
| 58 | Drive motors |
| 59 | Processor |
| 60 | Prints |
| 62,68,70 | Images |
| 64,66,69,72,76,78, 86, 88 | Lines |
| 80 | Bar code |
| 82, 84 | Code segments |
| 89, 90 | Human readable characters |

What is claimed is:

1. A method of providing information on a back side of a developed photographic medium having an image carrying layer on a front side, the method comprising the steps of:

reading a machine readable code on the developed image carrying layer on the front side of the photographic medium; and printing information on the back side of the developed photographic medium with a printer, based on the machine readable code;

wherein a plurality of photographic images are present on the photographic medium and at least part of the machine readable code is written on the photosensitive layer as separate code segments adjacent respective photographic images, and the machine readable code includes printer instructions which are received by the printer, that instruct the printer as to the location on the back side of the developed photographic medium where the printer is to print the information.

2. A method according to claim 1 wherein the information is printed on the back side of the developed photographic medium opposite each of a plurality of the photographic images.

3. A method according to claim 1 wherein the information is printed on the back side at a position which is not opposite the code printed on the front side, the method additionally comprising, after the code has been read, cutting one or more regions of the developed photographic medium which carry the machine readable code from the remainder of the developed photographic medium.

4. A method of providing information on a back side of a photographic medium having a photosensitive layer on a front side, the method comprising the steps of:

using a modulated light source to write a photographic image on the photosensitive layer;

using a modulated light source to write machine readable code on the photosensitive layer;

developing the photographic medium;

reading the machine readable code on the front side of the developed photographic medium; and printing information on the back side of the developed photographic medium with a printer, such that a content of the information which is to be printed is determined from the machine readable code;

wherein the machine readable code includes printer instructions which are received by the printer, which instruct the printer as to the location on the back side of the photographic medium where the printer is to print the information.

5. A method according to claim 4 wherein a plurality of photographic images are written on the photographic medium as a customer order, and wherein information is printed on the back side of the developed photographic medium opposite each of the photographic images.

6. A method according to claim 5 wherein at least part of the machine readable code is written on the photosensitive layer as separate code segments adjacent respective photographic images.

7. A method according to claim 4 wherein the information is printed on the back side at a position which is not opposite the code on the front side, the method additionally comprising, after the code has been read, cutting one or more regions of the developed photographic medium which carry the machine readable code from the remainder of the developed photographic medium.

8. A method according to claim 4 wherein the same modulated light source is used to write both the photographic image and the machine readable code on the photosensitive layer.

9. A method according to claim 4 wherein a plurality of photographic images are written on the photosensitive layer and wherein the machine readable code includes cutting instructions, the method additionally comprising receiving the cutting instructions at a cutter and separating the developed images with the cutter at locations based on the received cutting instructions.

10. A method according to claim 4 wherein the information printed on the back side includes human readable characters.

11. A method according to claim 4 additionally comprising using a modulated light source to write human readable characters on the front side of the photographic medium prior to development.

12. A method according to claim 11 wherein the photographic medium has two opposed parallel straight line side edges, and wherein the machine readable code and human readable characters are spaced apart along a line parallel with or orthogonal to the side edges.

13. An apparatus for providing information on a back side of a developed photographic medium having an image carrying layer and a plurality of photographic images on a front side, the apparatus comprising:

a reader to read machine readable code in the developed imaging carrying layer on the front side of the photographic medium;

a printer communicating with the reader so as to print information on the back side of the developed photographic medium which is at least partly based on the machine readable code and a processor communicating with the reader and the printer and which causes the printer to print on one or more locations on the back side based on the read code.

14. An apparatus according to claim 13 wherein said processor further communicates with the reader and the printer and which, in response to a predetermined code in the code by the reader, causes the printer to print the information on the back side of the developed photographic medium opposite each of the photographic image.

15. An apparatus according to claim 13 additionally comprising a driver to move the photographic medium past the reader in a first direction, and wherein the reader is positioned to read machine readable codes at most positions across the photographic media as it is moved past the reader.

16. An apparatus according to claim 13 additionally comprising a cutter, said processor communicating with the reader, the printer and the cutter, wherein, after the code has been read, the processor causes the cutter to separate one or more regions of the developed photographic medium which carry the machine readable code from the remainder of the developed photographic medium.

17. An apparatus according to claim 13 wherein said processor further communicates with the reader and the printer and which, in response to a predetermined code in the code read by the reader, causes the cutter to separate a plurality of developed images at locations based on the code read by the reader.

18. An apparatus for providing information on a back side of a photographic medium having a photosensitive layer on a front side, the apparatus comprising:

a modulated light source to write a photographic image on the photosensitive layer;

a modulated light source to write machine readable code on the photosensitive layer;

a developer to chemically develop the photographic medium;

a reader to read the machine readable code on the front side of the developed photographic medium;

a printer communicating with the reader so as to print information on the back side of the developed photographic medium such that a content of the information which is to be printed is determined from the machine readable code; and a processor communicating with the reader and the printer and which, in response to a predetermined code in the code read by the reader, causes the printer to print the information on the back side of the developed photographic medium opposite each of the photographic images.

19. An apparatus according to claim 18 additionally comprising a driver to move the photographic medium past the reader in a first direction, and wherein the reader is positioned to read the machine readable code at most positions across the photographic media as it is moved past the reader.

20. An apparatus according to claim 18 additionally comprising a cutter, said processor communicating with the reader, the printer and the cutter, wherein, after the code has been read, the processor causes the cutter to separate one or more regions of the developed photographic medium which carry the machine readable code from the remainder of the developed photographic medium.

21. An apparatus according to claim 18 wherein a single modulated light source writes both the photographic image and the machine readable code on the photosensitive layer.

22. An apparatus according to claim 18 wherein said processor communicates with the reader and the printer and causes the printer to print on one or more locations on the back side based on the read code.

23. An apparatus according to claim 18 wherein said processor communicates with the reader and the printer and, in response to a predetermined code in the code read by the reader, causes the cutter to separate a plurality of developed images at locations based on the code read by the reader.

* * * * *